United States Patent
Park et al.

(10) Patent No.: US 10,084,831 B2
(45) Date of Patent: *Sep. 25, 2018

(54) METHOD AND APPARATUS FOR IMPROVING QUALITY OF MULTIMEDIA STREAMING SERVICE

(71) Applicants: Samsung Electronics Co., Ltd., Gyeonggi-do (KR); UNIVERSITY-INDUSTRY COOPERATION GROUP OF KYUNG HEE UNIVERSITY, Gyeonggi-do (KR)

(72) Inventors: Kyung-Mo Park, Seoul (KR); Doug-Young Suh, Gyeonggi-do (KR); Yong-Hun Lee, Gyeonggi-do (KR); Jae-Yeon Song, Seoul (KR)

(73) Assignees: Samsung Electronics Co., Ltd (KR); University-Industry Cooperation Group of Kyung Hee University (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/357,637

(22) Filed: Nov. 21, 2016

(65) Prior Publication Data

US 2017/0126761 A1    May 4, 2017

Related U.S. Application Data

(63) Continuation of application No. 14/219,672, filed on Mar. 19, 2014, now Pat. No. 9,503,492, which is a
(Continued)

(30) Foreign Application Priority Data

Jul. 20, 2010 (KR) .................. 10-2010-0070194
Aug. 19, 2010 (KR) .................. 10-2010-0080553
(Continued)

(51) Int. Cl.
*H04L 29/06* (2006.01)
*H04L 29/08* (2006.01)

(52) U.S. Cl.
CPC ........ *H04L 65/4069* (2013.01); *H04L 65/602* (2013.01); *H04L 67/02* (2013.01); *H04L 67/42* (2013.01); *H04L 69/16* (2013.01)

(58) Field of Classification Search
None
See application file for complete search history.

(56) References Cited

U.S. PATENT DOCUMENTS

2003/0188182 A1    10/2003    Sato et al.
2007/0157283 A1    7/2007    Setlur et al.
(Continued)

FOREIGN PATENT DOCUMENTS

WO    WO 03/105004    12/2003

OTHER PUBLICATIONS

Qualcomm Incorporated, "Use Cases and Examples for Adaptive HTTP Streaming", S4-100408, 3GPP TSG-SA4 #58, Jun. 21-24, 2010.
(Continued)

*Primary Examiner* — Henry Tsang
(74) *Attorney, Agent, or Firm* — The Farrell Law Firm, P.C.

(57) ABSTRACT

A method for receiving a media data is provided. The method includes receiving, by a client from a server, a media presentation description (MPD) including segment information; and receiving media data based on the MPD, wherein the media data comprises a segment, wherein the segment includes a fragment, and wherein the fragment includes a subfragment, wherein the segment information indicates a location of the media data, and wherein the segment information comprises segment index information indicating a
(Continued)

corresponding byte range related one fragment, and fragment index information for accessing different levels of a plurality of subfragments.

4 Claims, 8 Drawing Sheets

Related U.S. Application Data continuation of application No. 13/187,113, filed on Jul. 20, 2011, now Pat. No. 8,694,669.

(30) Foreign Application Priority Data

Oct. 15, 2010 (KR) ......................... 10-2010-0101121
Jan. 24, 2011 (KR) ......................... 10-2011-0007075
Jan. 25, 2011 (KR) ......................... 10-2011-0007236

(56) References Cited

U.S. PATENT DOCUMENTS

| | | |
|---|---|---|
| 2009/0119594 A1 | 5/2009 | Hannuksela |
| 2009/0199100 A1 | 8/2009 | Hwang |
| 2009/0232220 A1 | 9/2009 | Neff et al. |
| 2010/0094963 A1 | 4/2010 | Zuckerman et al. |
| 2010/0138736 A1 | 6/2010 | Wan |
| 2010/0153578 A1 | 6/2010 | Van Gassel et al. |
| 2010/0166309 A1 | 7/2010 | Hull et al. |
| 2010/0262711 A1* | 10/2010 | Bouazizi ............... H04L 65/00 709/231 |
| 2011/0119394 A1 | 5/2011 | Wang et al. |
| 2011/0307545 A1 | 12/2011 | Bouazizi |
| 2011/0317771 A1 | 12/2011 | Chen et al. |

OTHER PUBLICATIONS

Qualcomm Incorporated, "Response to the CfP on HTTP Streaming: Adaptive Video Streaming based on AVC", ISO/IEC JTC1/SC29/WG11, MPEG2010/M17909, International Organisation for Standardisation, Coding of Moving Pictures and Audio, Jul. 2010.
cfp on HTTP Streaming: 3GPP Adaptive HTTP Streaming; Proposal to MPEG HTTP Streaming, 93rd MPEG, No. M17875, XP030001643, Jul. 22, 2010, 61 pages.
European Search Report dated Oct. 6, 2016 issued in counterpart application No. 11809873.0-1908, 7 pages.

* cited by examiner

METHOD AND APPARATUS FOR IMPROVING QUALITY OF MULTIMEDIA STREAMING SERVICE

PRIORITY

This application is a Continuation of, and claims priority under 35 U.S.C. § 120 to, U.S. patent application Ser. No. 14/219,672, filed Mar. 19, 2014, which is a Continuation of, and claims priority under 35 U.S.C. § 120 to, U.S. patent application Ser. No. 13/187,113, filed Jul. 20, 2011, and is now issued as U.S. Pat. No. 8,694,669 on Apr. 8, 2014, which claims priority under 35 U.S.C. § 119(a) to Korean Patent Applications filed in the Korean Intellectual Property Office on Jul. 20, 2010 and assigned Serial No. 10-2010-0070194, on Aug. 19, 2010 and assigned Serial No. 10-2010-0080553, on Oct. 15, 2010 and assigned Serial No. 10-2010-0101121, on Jan. 24, 2011 and assigned Serial No. 10-2011-0007075, and on Jan. 25, 2011 and assigned Serial No. 10-2011-0007236, respectively, the contents of all of which are incorporated herein by reference.

BACKGROUND OF THE INVENTION

1. Field of the Invention

The present invention relates generally to Hypertext Transfer Protocol (HTTP)/Transmission Control Protocol (TCP)-based multimedia service, and more particularly, to an apparatus and method for ensuring service quality in HTTP/TCP-based multimedia service.

2. Description of the Related Art

In HTTP-based multimedia service, data is transmitted and received between a client and a server by exchanging a content request (HTTP GET) with a response (HTTP Response) to the content request. When the client initially accesses the server, the server transmits a serviceable content list and a Media Presentation Description (MPD) for media content to the client. The MPD describes information required for the client to receive the media content, such as the type of the media content, the average bit rate of the media content, and the Uniform Resource Identifiers (URIs) or Uniform Resource Locators (URLs) of content Segments covering a time unit. The client repeatedly requests necessary content based on the MPD.

Clients differ as to their terminals and network situations. To meet service requirements of clients of various terminals in various networks, the server may have coded streams with different quality levels for the same content. Therefore, a client may request a stream with an appropriate quality to the server according to its terminal or network state, thereby enabling a seamless service.

The MPD segments a media stream on a time unit basis. Thus, each time a client requests media content, the client selects one of stream segments in the same time zone according to its situation and transmits an HTTP GET for the selected stream segment to the server. In response to the client request, the server transmits the stream segment together with a response message header (with status code 200 OK).

If the response message is too large, the server transmits the response message separately in one or more TCP packets. Upon successful receipt of all TCP packets, the client reconstructs the original HTTP response message with the TPC packets.

TCP adopts Automatic Repeat reQuest (ARQ) to ensure the reliability of data transmission and reception. According to ARQ, when a transmitter receives a response message indicating detection of an error in received data, that is, a Negative ACKnowledgment (NACK) message from a receiver, or fails to receive any response message within a predetermined time from the receiver, the transmitter automatically retransmits data to the receiver. Therefore, transmission reliability can be ensured for every TCP-based service, such as an HTTP or File Transfer Protocol (FTP) service.

If any of the TCP packets is lost or erroneous, the TCP packet is retransmitted until it is successfully received. In this manner, TCP-based services such as HTTP or FTP services achieve transmission reliability.

However, when a TCP packet is lost due to congestion or interference during data transmission or retransmission, unreliability occurs frequently at the TCP layer because of errors or a poor channel state, an end-to-end transmission delay becomes excessive.

Moreover, if the network state is poor and the size of transmission data at the HTTP layer is large, the end-to-end transmission delay becomes excessive and compromises service quality for a delay-sensitive service such as multimedia service.

FIG. 1 illustrates a data transmission and reception operation at the HTTP layer (in the upper diagram) and a data transmission and reception operation at the TCP layer (in the lower diagram), according to the prior art.

In the upper diagram of FIG. 1, a server responds to a request received from a client at the HTTP layer. Only when the client completely receives a response message (with status code 200 OK) from the server, may the client process the response message.

In the lower diagram of FIG. 1, the server transmits the response message separately in TCP packets to the client at the TCP layer. Upon generation of an error or data loss during transmission, an erroneous or lost TCP packet is retransmitted. As this operation is repeated until all TCP packets are successfully transmitted, a transmission delay is caused. In addition, when data loss occurs, the resulting decreased transmission rate also leads to a transmission delay.

In a conventional HTTP-based media streaming service, a stream is segmented on a time basis and a stream segment requested by a client is delivered to the client. Therefore, it becomes difficult to reduce an initial buffering delay.

TCP also adopts a slow start method for flow control. According to the slow start method, upon generation of data loss during data transmission at a gradually increased bit rate, the bit rate is reduced significantly and then data is transmitted at the low bit rate. Since an available bit rate cannot be fully utilized in wireless communication experiencing the aforementioned data loss, the slow start method significantly decreases system efficiency.

SUMMARY OF THE INVENTION

An aspect of embodiments of the present invention is to address at least the problems and/or disadvantages and to provide at least the advantages described below. Accordingly, an aspect of the present invention is to provide a method and apparatus for providing an HTTP-based multimedia streaming service to prevent degradation of service quality caused by end-to-end transmission delay.

Another aspect of the present invention is to provide a method and apparatus for providing an HTTP-based multimedia streaming service to reduce a transmission delay and increase resource utilization efficiency.

A further aspect of the present invention is to provide a method and apparatus for providing an HTTP-based multimedia streaming service to ensure service quality through reduction of a possible transmission delay and full utilization of an available bit rate.

In accordance with one aspect of the present invention, there is provided a method for receiving a media data is provided. The method includes receiving, by a client from a server, a media presentation description (MPD) including segment information; and receiving media data based on the MPD, wherein the media data comprises a segment, wherein the segment includes a fragment, and wherein the fragment includes a subfregment, wherein the segment information indicates a location of the media data, and wherein the segment information comprises segment index information indicating a corresponding byte range related one fragment, and fragment index information for accessing different levels of a plurality of subfragments.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS
OF THE INVENTION

Hereinafter, embodiments of the present invention will be described in detail with reference to the accompanying drawings. In the following description and the accompanying drawings, well-known functions and structures will not be described if they unnecessarily obscure the subject matter of the present invention. Further, a detailed description of known functions and configurations incorporated herein will be omitted for the sake of clarity and conciseness.

The present application discloses the following three methods to reduce a transmission delay and thus to ensure service quality in an HTTP-based multimedia streaming service.

One of the transmission delay reduction methods is timeout-based data transmission and reception. Since the multimedia service is delay-sensitive, repeated retransmissions intended to ensure reliability only degrade service quality. Accordingly, a server, a client or a proxy sets a timeout, taking into account the status of a client buffer and the situation of the network, and only data transmitted within the timeout is processed, thereby reducing an end-to-end transmission delay for a user in a poor network situation. Accordingly, the use of HTTP partial transmission and timeout can lead to a decreased transmission delay, reduce an initial presentation delay and a zapping delay caused by channel zapping and random access, and provide reliable service qualities.

Another transmission delay reduction method is to prevent a slow start through ACKnowledgment (ACK) spoofing, in spite of data loss on a radio channel and thus to reduce a transmission delay and efficiently utilize an available bit rate.

A third method for transmission delay reduction is to slowly start transmission with low-quality data, using a preview channel or Segment, so as to reduce an initial buffering delay and a channel zapping delay.

A detailed description will now be given of a delay reduction method according to an embodiment of the present invention.

An MPD for HTTP partial transmission contains information about priority levels of media content and range information for each priority level. For example, when an MPEG-4/AVC-encoded video is serviced, a stream is segmented on a time unit basis (e.g. 2 seconds) and information about the addresses of the stream segments is written in an MPD, as in conventional HTTP-based media streaming. Therefore, a client may conventionally request and receive a service only on the basis of a stream time unit specified by the MPD.

In this context, the embodiment of the present invention seeks to satisfy various clients' demands by writing media priority information and stream range information reconstructed using the priority information (offsets or positions in a stream file) in an MPD.

Figure 1:
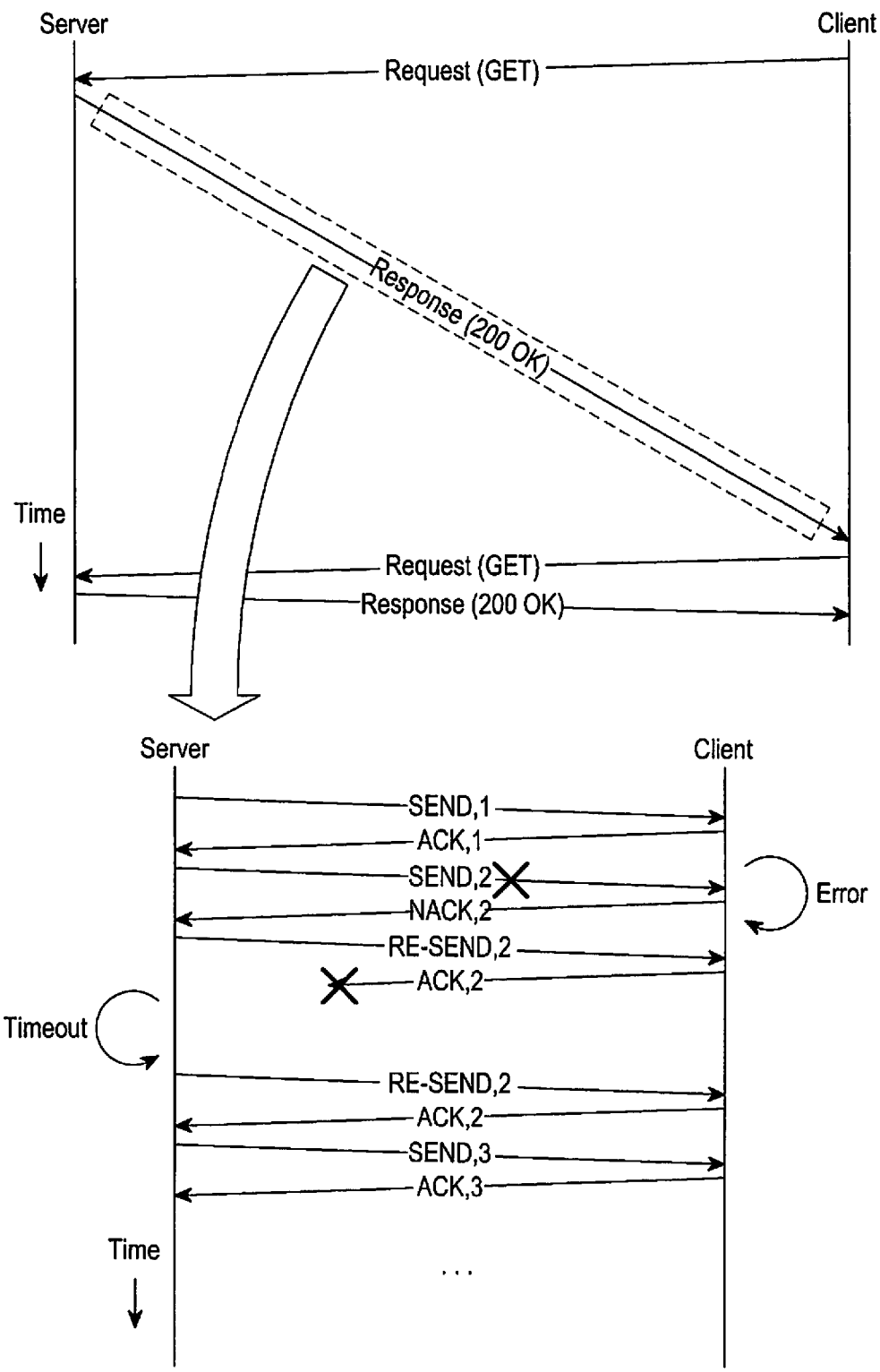
FIG. 1 illustrates a conventional data transmission and reception operation at an HTTP layer (in the upper diagram) and a data transmission and reception operation at a Transmission Control Protocol (TCP) (in the lower diagram)
Figure 2:
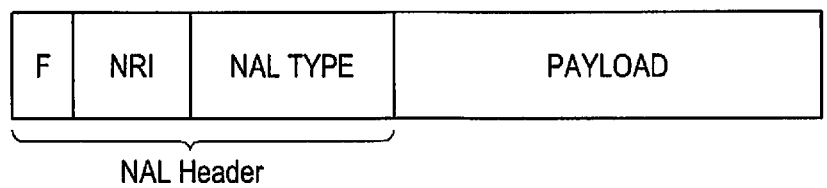
FIG. 2 illustrates a Moving Picture Experts Group-4 (MPEG-4)/Advanced Video Coding Network Abstraction Layer (AVC NAL) header, to which embodiments of the present invention are applied.

FIG. 2 illustrates an MPEG-4/AVC NAL header, to which an embodiment of the present invention is applied.

A stream is reconstructed to have the same NAL Reference Index (NRI) value, for example, using an NRI field in the MPEG-4AVC NACL header and the NRI value and range information about the stream is written in an MPD. A client requests a part of content (e.g. a preview) by requesting partial transmission of data including only intra frames (HTTP Partial GET) using the NRI field. In this manner, a part (e.g. a preview) of the content may be displayed to a user.

Conventionally, ACK spoofing is used at the TCP layer in order to solve the transmission delay problem. However, the TCP needs modifying to use ACK spoofing at the TCP layer. Accordingly, the present application discloses timeout at an application layer, which may be used by a server, a client, or a proxy in a network to reduce a transmission delay that may occur due to TCP-layer ARQ.

Figure 3:
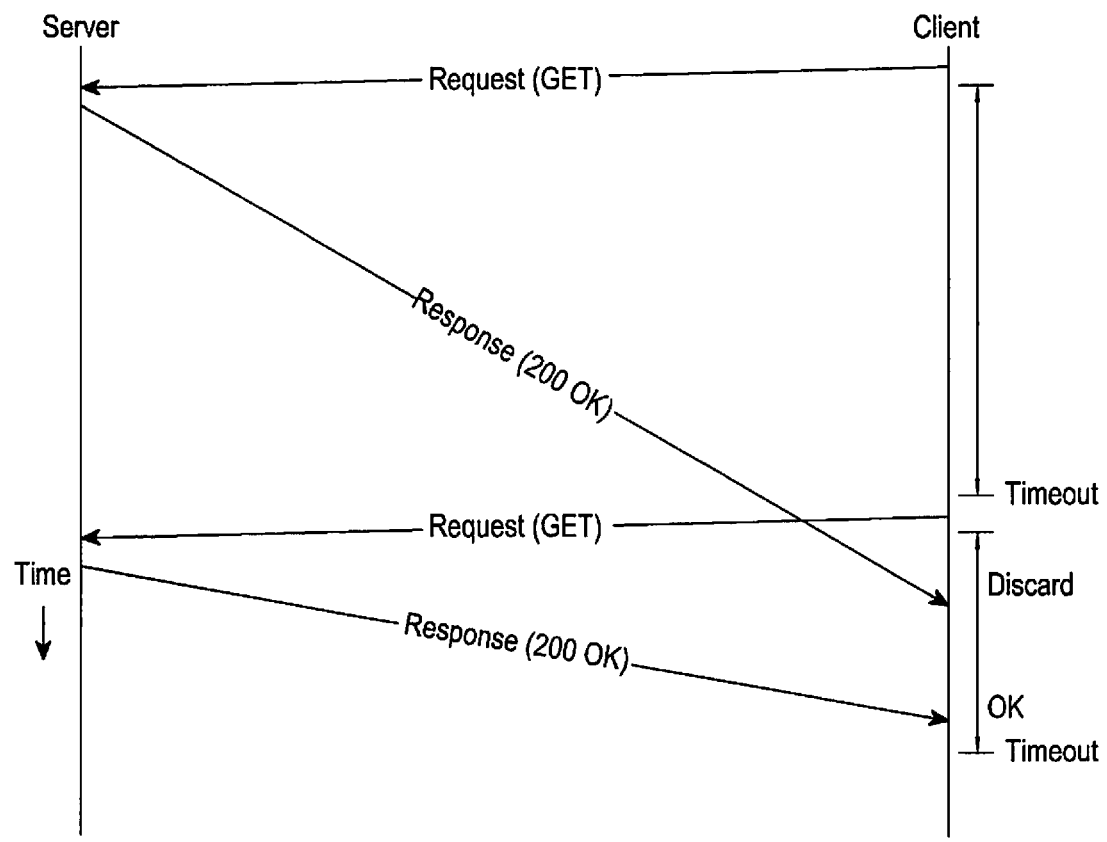
FIG. 3 illustrates a client timeout-based transmission and reception operation, according to an embodiment of the present invention.

FIG. 3 illustrates a client timeout-based transmission and reception operation, according to an embodiment of the present invention.

Referring to FIG. 3, an HTTP streaming client requests necessary data (HTTP GET) and then activates a timer (or counter) for a timeout event. Upon receipt of a response message to the request from the server before the timeout event occurs, the HTTP streaming client processes the response message as normally received. On the other hand, upon generation of the timeout event before the response message arrives at the client, the client takes the next action irrespective of whether the response message has been received.

Figure 4:
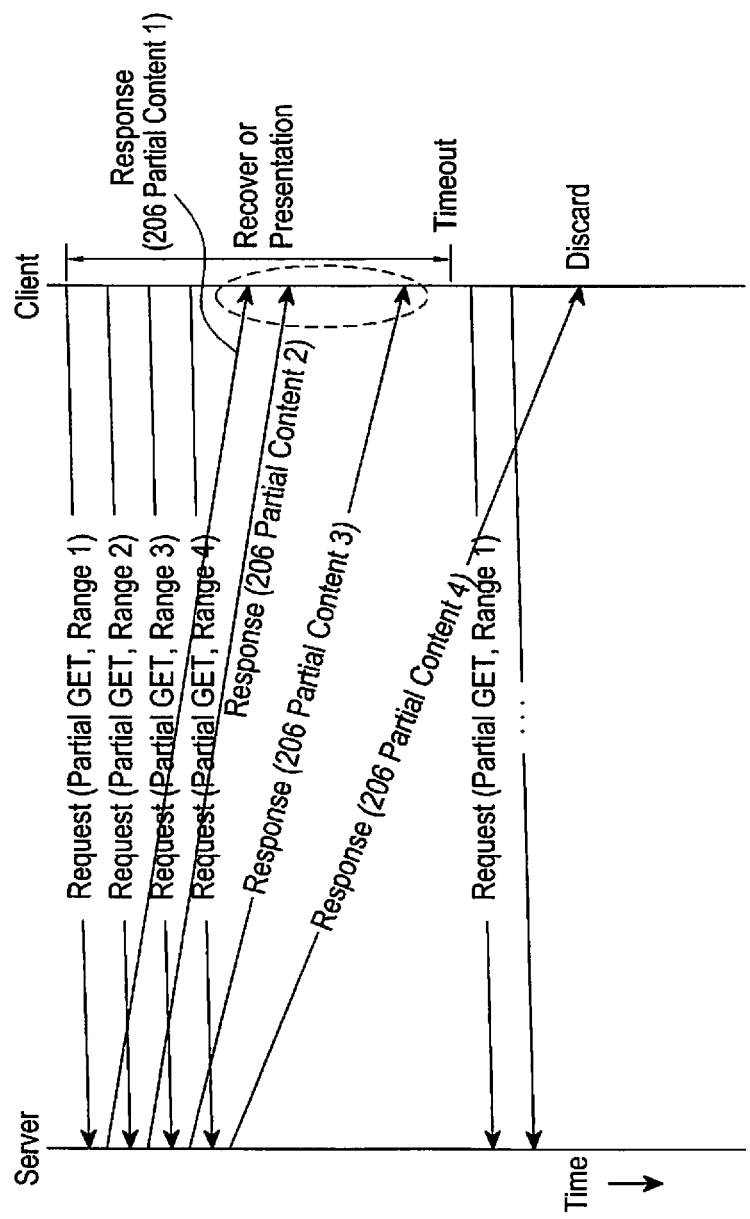
FIG. 4 illustrates a transmission and reception operation based on client timeout and HTTP partial transmission, according to an embodiment of the present invention.

FIG. 4 illustrates a transmission and reception operation based on client timeout and HTTP partial transmission, according to an embodiment of the present invention.

A server-based timeout method and a proxy-based timeout method are the same in terms of their processes except for entities responsible for determining a timeout. A timeout determining procedure is most important in a timeout-based method. In this embodiment of the present invention, a timeout is determined based on the buffer state of a client and content quality is additionally adapted for the client according to the buffer state of the client. An example of a client buffer model will be described below.

As stated before, Periods or ranges of a transmittable media data file are specified in an MPD in a file structure designed to use the above method. The server or client receives the information and performs content quality adaptation by a partial transmission and unit structure transmission scheme, referring to the specified Periods and ranges.

Figure 5:
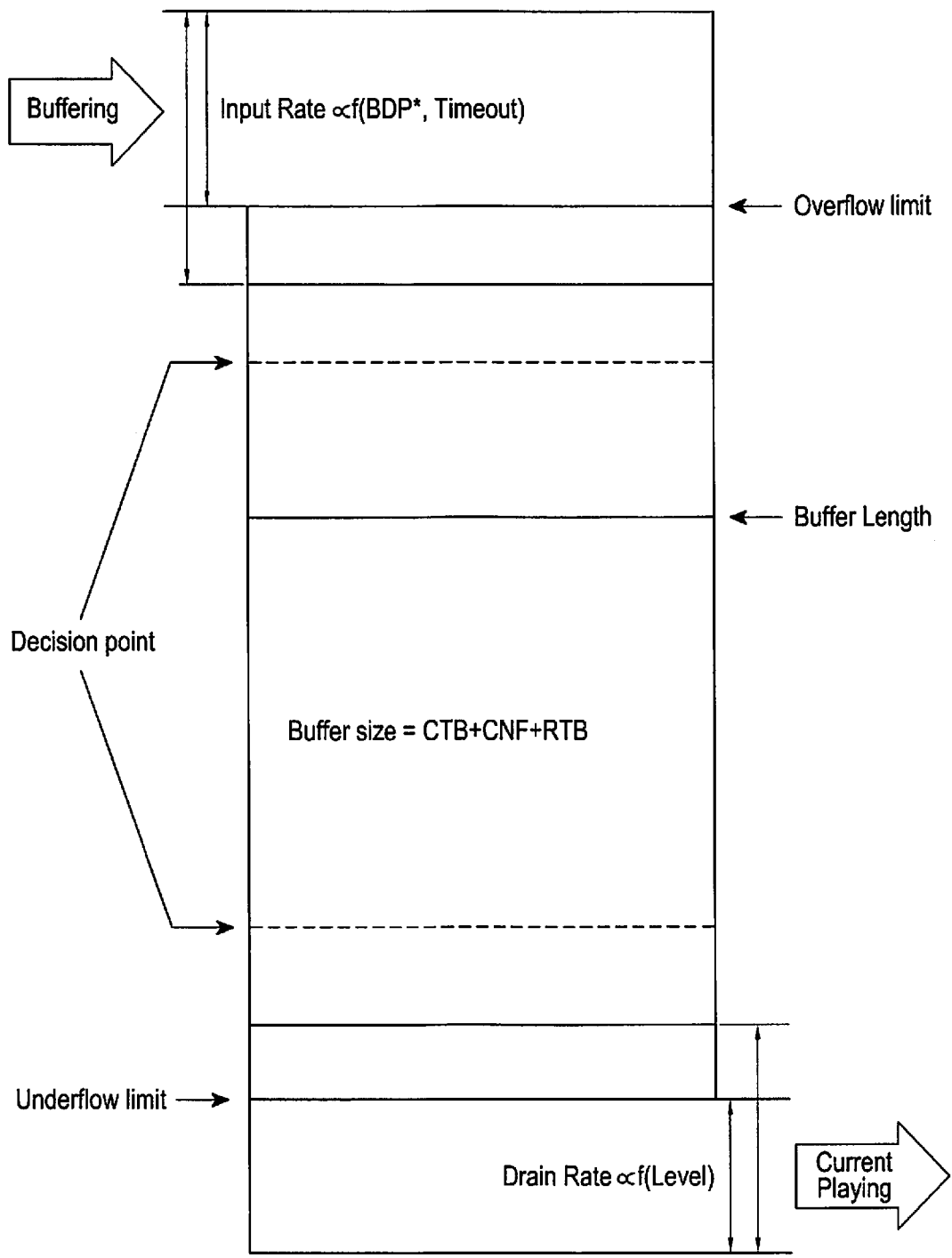
FIG. 5 illustrates a client buffer model, according to an embodiment of the present invention.

FIG. 5 illustrates a client buffer model, according to an embodiment of the present invention.

A client buffer may be divided largely into an input unit for receiving data that has normally arrived (within a timeout), an output unit for outputting buffered data for decoding, and a buffer controller for performing service quality adaptation and determining a timeout according to a current buffer length.

A data input rate is determined for the input unit according to a service request of the client and a network situation. A drain rate is determined for the output unit according to the quality of currently output content. The buffer controller first determines a buffer length. Specifically, the buffer controller determines the total buffer length of the client by summing the buffer requirements of a buffer needed for service content, a buffer needed due to a network delay, and a retransmission buffer used to cope with a retransmission delay over a wired/wireless interface.

In FIG. 5, the service quality level and timeout of the next service are adjusted by comparing two decision points or levels inside a buffer with a current buffer length. For instance, the buffer controller may operate as follows.

If the amount of data buffered in the buffer, that is, a buffer length is larger than an upper decision point, buffer overflow is expected. Thus, a long timeout is set to thereby increase transmission reliability, and a time gap is set before a request of the next Segment. If the buffer length is smaller than a lower decision point, the service level and the timeout are decreased due to expected buffer underflow.

However, when a service level and a timeout are determined using only decision points and a current buffer length, the resulting frequent changes may decrease a desired quality. Introduction of a counter may decrease the frequent service level and timeout changes. In addition, although some data may be lost due to the timeout, the lost data can be recovered by a channel coding method.

1) Performance Improvement by Allowing Partial Reception (k-n) parity symbols are added to a Segment with k symbols and transmission of the total n symbols is attempted. If any k symbols out of the n symbols are received, the transmission is discontinued using the above-described timeout method, thereby reducing a transmission time. That is, the transmission time is shortened by terminating the transmission when any k symbols out of the n transmitted symbols (n>k) are received, rather than when all of k transmitted symbols are received. If the (n-k) parity symbols are created using a Reed Solomon (RS) code, reception of k symbols out of the n transmitted symbol is sufficient for data recovery. However, with a Raptor code, more than k symbols need to be received in order to increase a recovery completion probability. When the RS code is used, the number of received symbols is monitored and a timeout is declared upon receipt of k symbols. When the Raptor code is used, Raptor decoding is performed simultaneously with symbol reception. Upon completion of the Raptor decoding, a timeout is declared, which is more efficient.

2) Performance Improvement Based on ACK Spoofing

Figure 6:
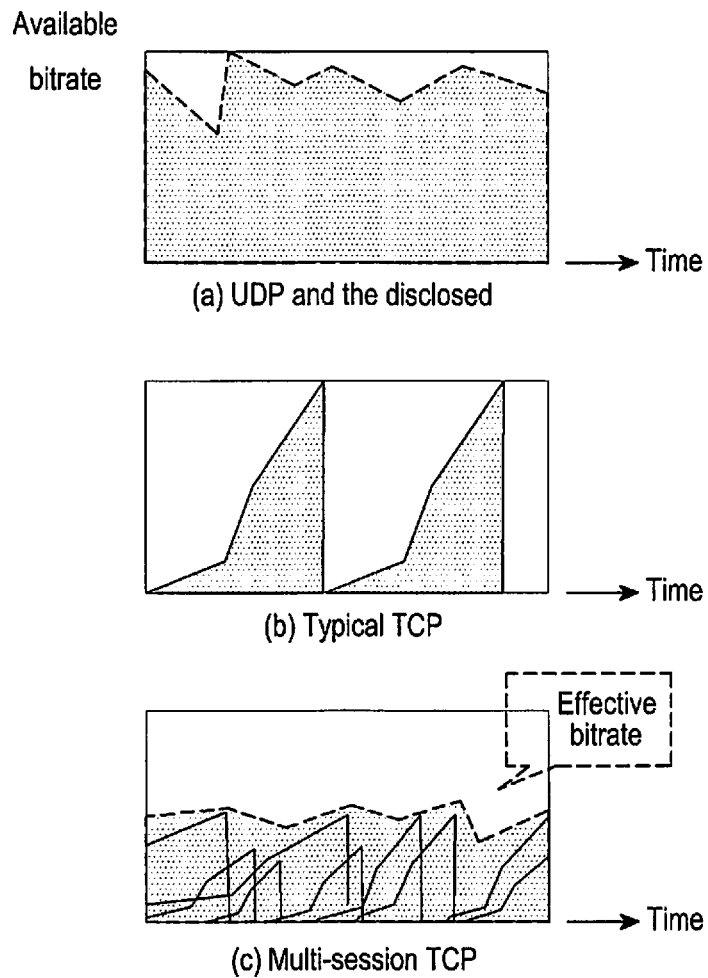
FIG. 6 illustrates a transmission delay situation, according to an embodiment of the present invention.

FIG. 6 illustrates a transmission delay situation. Conventionally, TCP adopts slow start for flow control, as illustrated in (b) of FIG. 6. According to the slow start method, a bit rate is gradually increased. When data loss occurs, the bit rate is significantly dropped and then the slow start re-occurs, for flow and congestion control. As this operation is repeated, the bit rate fluctuates as illustrated in (b) of FIG. 6. As a result, an available bit rate is not fully utilized, causing a transmission delay. Particularly, wireless communication suffers a longer transmission delay because transmission starts slowly at a bit rate that has not increased sufficiently due to packet loss caused by fading-incurred bit errors or collision on a channel. Accordingly, embodiments of the present invention reduce the number of slow starts through ACK spoofing, in case of packet loss caused by fading or collision on a channel. As partial reception is allowed according to the afore-described 'partial reception method', ACK spoofing enables full utilization of an available bit rate and complete reception of an intended Segment.

3) Performance Improvement by Preview

According to an embodiment of the present invention, a buffering delay such as an initial delay and a channel zapping delay can be reduced in HTTP-based multimedia streaming.

Figure 7:
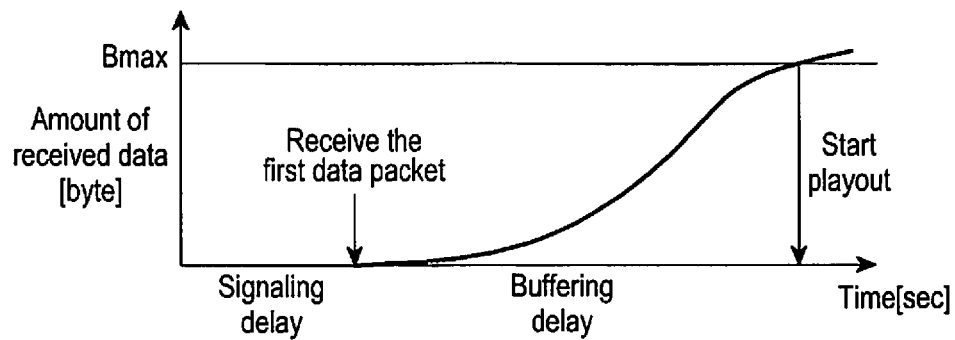
FIG. 7 illustrates an application layer buffer and an initial delay, according to an embodiment of the present invention.

FIG. 7 illustrates an application layer buffer and an initial delay, according to an embodiment of the present invention.

Referring to FIG. 7, an initial buffering delay is determined, taking into account de-jittering and de-interleaving. In case of Video On Demand (VOD), the initial buffering delay is typically 5 to 10 seconds. After the buffering delay, a steady buffer state is maintained and thus interrupt-free playback is possible. A de-jittering delay is determined according to a change in an end-to-end transmission rate and a change in a bit rate required for content.

Let the de-jittering and de-interleaving delay be denoted by $T_D$ and the maximum rate of a media stream be denoted by $R_{max}$. Then, an initial buffer length $B_{max}=R_{max}*T_D$. That is, when as much data as $B_{max}=R_{max}*T_D$ is buffered in a receiver buffer, a client may start to play back the media stream. Although a signaling delay may not be reduced, the buffering delay can be reduced by decreasing the maximum rate of a media stream, $R_{max}$, which means decreasing a target value for the steady buffer state.

Figure 8:
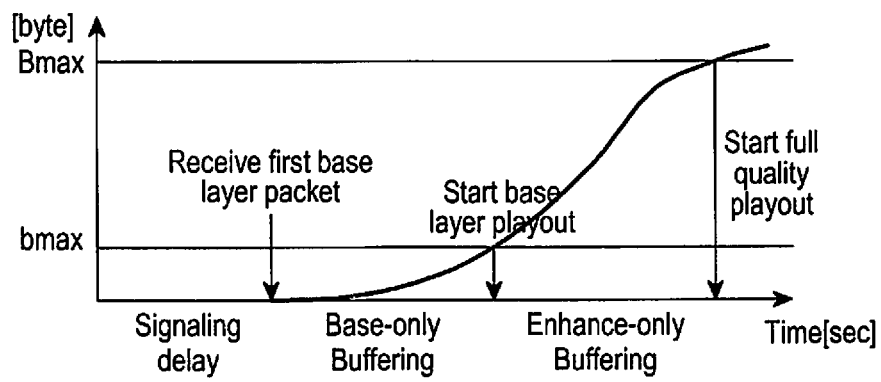
FIG. 8 illustrates a method for reducing a buffering delay by changing a target value for a steady buffer state, according to an embodiment of the present invention.

FIG. 8 illustrates a method for reducing a buffering delay by changing a target value for the steady buffer state, according to an embodiment of the present invention.

For example, a video stream is encoded by layered coding and a base layer stream with a maximum bit rate $r_{max}(<R_{max})$ and an enhancement layer are separately stored. Only the base layer is initially transmitted until $b_{max}=r_{max}*T_D$. In this manner, the buffering delay may be reduced. Since $10r_{max}=R_{max}$ on the whole, the buffering delay is decreased to about 1/10 in this method. When buffering reaches $B_{max}$, a video is played back with normal quality. This method is also applicable to a layered coding scheme and other general coding schemes, but is inefficient in a poor network situation.

Second, if even though the steady buffer state has not been reached, playback starts immediately when reproducible information arrives, the time taken for initial presentation may be reduced.

Figure 9:
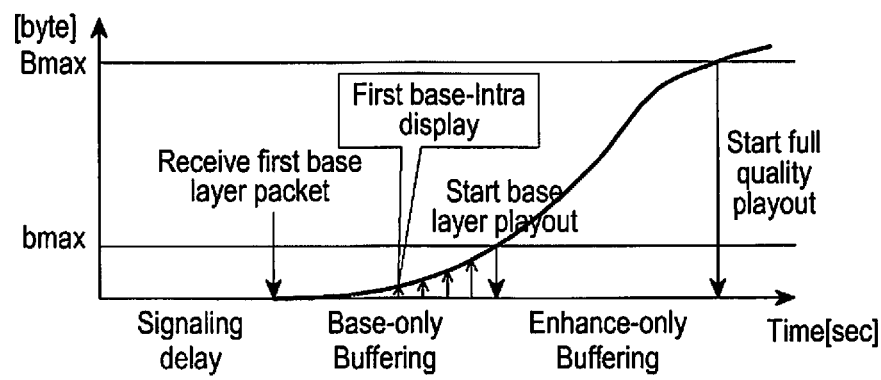
FIG. 9 illustrates a method for reducing a buffering delay based on intra frames, according to an embodiment of the present invention.

FIG. 9 illustrates a method for reducing a buffering delay based on intra frames, according to an embodiment of the present invention.

Referring to FIG. 9, upon arrival of at least one intra frame, playback immediately starts, thereby shortening the time taken for initial presentation. Therefore, the initial buffering delay may be reduced by means of an MPD containing priority information according to an embodiment of the present invention and HTTP partial transmission.

If the Group Of Picture (GOP) period of a base layer is 1/10 of a TD, the buffering delay may be reduced to 1/10 according to this method. Encoding of the base layer in such a manner that the intra period of the base layer is smaller than the intra period of the enhancement layer will be helpful. An initial presentation of the base layer may sufficiently notify a user of what is broadcast on this channel. A marker is needed to indicate arrival of an intra frame of the base layer to the system.

The two methods according to the two embodiments of the present invention are applicable to both cases of starting content and channel switching. According to these methods, an initial delay and channel zapping delay of 5 to 10 seconds at present may be decreased to or below about 200 ms.

The present invention can be applied to HTTP streaming, the standardization of which is being developed by the MPEG-Dynamic Adaptive HTTP Streaming (DASH) and 3rd Generation Partnership Project (3GPP). The MPEG-DASH and 3GPP defines an MPD for HTTP streaming. An HTTP streaming client may index one or more Periods, Representations, and Segments based on the MPD of media content, as illustrated in FIG. 10.

Figure 10:
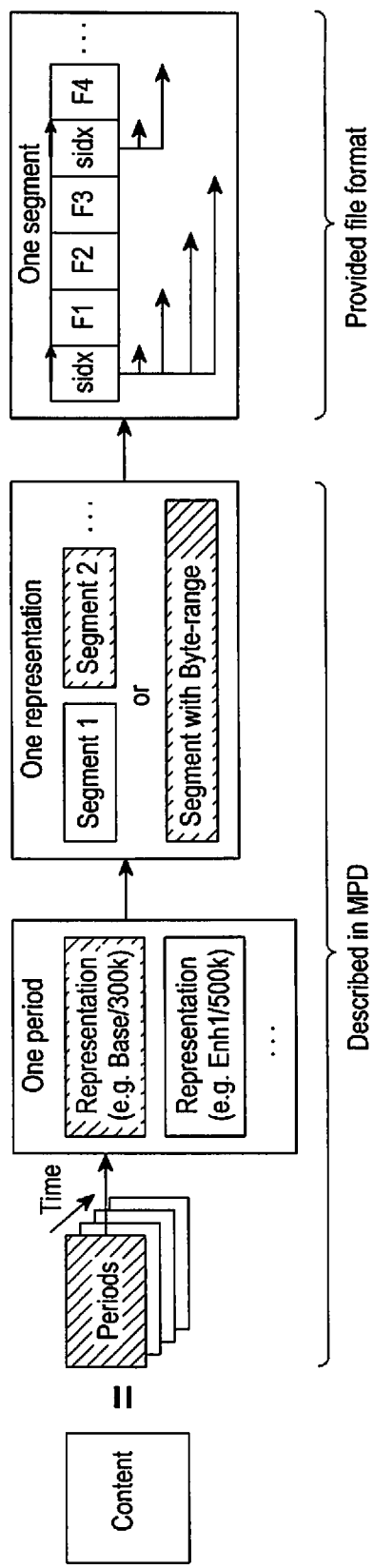
FIG. 10 illustrates a media index structure for MPEG and 3$^{rd}$ Generation Partnership Project (3GPP) HTTP streaming according to an embodiment of the present invention.

Specifically, FIG. 10 illustrates a media index structure for MPEG and 3GPP HTTP streaming according to an embodiment of the present invention.

An MPD extension according to an embodiment of the present invention may extend SegmentInfo of an existing MPD, as illustrated in Table 1.

TABLE 1

| type | A | CM Must be present if the "range" attribute is present | Indicates the type of a corresponding byte-range of the Segment, if a range exists for the Segment. In case of SegmentIndexBox, the type is sidx(s). The type is set to 0, 1, . . . , N for Priority and to time for sub-time. If Priority is '0', this is the highest |
|---|---|---|---|

TABLE 1-continued

| | | | priority. If a single Segment is divided into one or more ranges, the type of each range is distinguished by;. |
|---|---|---|---|
| duration | A | CM Must be present if the "type" attribute is "time" | Defines a duration for each range. If a single Segment is divided into one or more ranges, the duration of each range is distinguished by;. |

In accordance with the embodiment of the present invention, the above SegmentInfo extension enables an effective operation for each of the following user cases.

(Case 1) "Peter watched a soccer match involving his favorite team. The goal in the 64th minute made him so excited that he wants to watch it over and over again. He finds a recording of the game on the homepage of his local TV station and requests the segment containing the goal."

In general, an MPD and index information contained in a segment index (sidx) box enables a DASH client of Peter to seek Movie Fragment(s) (moof(s)) within a Segment corresponding to the 64th minute. The moof(s) that provide (provides) a Representation of the thrilling goal may be directly requested by an HTTP partial request.

In comparison, the following two methods are available according to embodiments of the present invention.

To access the moof(s) corresponding to the 64th minute that Peter wants to repeatedly watch in the current WD, the following procedure is needed.

A Segment nearest to the intended moof(s) is indexed based on SegmentInfo of the MPD and then transmission of sidx(s) is requested to index the moof(s) corresponding to the intended time within the Segment.

If the Segment has a single sidx, the sidx(s) transmission is requested by one HTTP partial request without sidx size information. If the Segment has multiple sidxs, the sidx(s) transmission is requested by two or more HTTP partial requests without sidx size information.

Subsequently, the intended moof(s) is(are) requested based on the downloaded sidx(s).

When the disclosed MPD extension (range with type="sidx(s)") is used, the following procedure is needed.

A Segment nearest to the intended moof(s) is indexed based on SegmentInfo of the MPD. Then, to index the moof(s) corresponding to the intended time within the Segment, transmission of sidx(s) is requested.

If the Segment has a single sidx, the sidx(s) transmission is requested by one HTTP partial request with sidx size information. If the Segment has multiple sidxs, the sidx(s) transmission is also requested by one HTTP partial request with sidx size information.

Subsequently, the intended moof(s) is(are) requested based on the downloaded sidx(s).

As described above, the use of the disclosed MPD extension may reduce service-client interactions needed for a user to request desired moof(s). In addition, sidx(s) of an accurate size may be requested by an HTTP partial request due to the presence of sidx(s) size information.

(Case 2) "Paul can't attend a concert given by his favorite band, but finds out that there will be a live stream of it on the band's homepage. He starts watching, but later on his friend comes by and wants to see it, too. Paul stops the stream and they watch it from beginning to end."

In general, an MPD for live streams describes the sequence of Segments including media content. The Segments remain valid at the same URL. The timeShiftBuffer- Depth attribute of the MPD indicates the time window of effectively (inexplicitly in this case) available Segments. A DASH client of Paul can easily request a Segment corresponding to the start of the Media Presentation and thus play back the Media Presentation from the start.

In accordance with the embodiment of the present invention, a Segment nearest to intended moof(s) is based on SegmentInfo of the MPD. Then, transmission of sidx(s) is requested to index the moof(s) corresponding to an intended time within the Segment.

If the Segment has a single sidx, the sidx(s) transmission is requested by one HTTP partial request without sidx size information. If the Segment has multiple sidxs, the sidx(s) transmission is requested by two or more HTTP partial requests without sidx size information.

Subsequently, the intended moof(s) is(are) requested based on the downloaded sidx(s).

(Case 3) "Mary wants to watch a stream of a TV series, but wants to skip the opening credits. She requests the stream starting from minute 3."

In general, an MPD and index information contained in a segment index box enables a DASH client of Mary to seek moof(s) corresponding to the $3^{rd}$ minute within a Segment. The moof(s) that provide (provides) a Representation starting at the $3^{rd}$ minute may be directly requested by an HTTP partial request.

In comparison, the following two methods are available according to embodiments of the present invention.

To access the moof(s) corresponding to the $3^{rd}$ minute that Mary wants to watch in the current WD, the following procedure is needed.

A Segment nearest to the intended moof(s) is indexed based on SegmentInfo of an MPD, and then transmission of sidx(s) is requested to index the moof(s) corresponding to the intended time within the Segment.

If the Segment has a single sidx, the sidx(s) transmission is requested by one HTTP partial request without sidx size information. If the Segment has multiple sidxs, the sidx(s) transmission is requested by two or more HTTP partial requests without sidx size information.

Subsequently, the intended moof(s) is(are) requested based on the downloaded sidx(s).

Meanwhile, when the disclosed MPD extension (range with type="sidx(s)") is used, the following procedure is needed.

A Segment nearest to the intended moof(s) is indexed based on SegmentInfo of an MPD. Then, to index the moof(s) corresponding to the intended time within the Segment, transmission of sidx(s) is requested.

If the Segment has a single sidx, the sidx(s) transmission is requested by one HTTP partial request with sidx size information. If the Segment has multiple sidxs, the sidx(s) transmission is also requested by one HTTP partial request with sidx size information.

Subsequently, the intended moof(s) is(are) requested based on the downloaded sidx(s).

As described above, the use of the disclosed MPD extension may reduce service-client interactions needed for a user to request a desired moof(s). In addition, sidx(s) of an accurate size may be requested by an HTTP partial request due to the presence of sidx(s) size information.

(Case 4) "Peter requests a new movie that was published recently and is not stored in the selected server. The movie file is efficiently distributed to the server to facilitate the request."

In general, this corresponds to a standard mode for HTTP caching in servers or Content Distribution Networks (CDNs). An attachment point initially selects a server according to Peter's network situation by a potential CDN load-balancing algorithm. A DASH client of Peter transmits an HTTP request for moof(s). Then the HTTP request is subjected to a standard HTTP cache procedure and not present in an HTTP cache requesting a Segment in an up-stream server. Eventually, the HTTP request reaches an origin server that ensures validity of a Segment.

In accordance with embodiments of the present invention, however, to rapidly respond to the user request, an origin server selectively uses an HTTP caching server or a CDN regarding a user's high-priority download request (e.g. type="0") or a user's frequent request (e.g. type="sidx(s)"). Thus, efficiency can be increased in terms of network bandwidth or memory space.

(Case 5) "Frank is watching a stream with a mobile device. In the beginning, he is moving a lot causing high network throughput fluctuations. When he finds a cafe, he sits down and watches the rest of the stream in relatively stable network conditions using the cafe's WLAN."

In general, when continuous streaming is insufficient in a current Representation (at a current bit rate) or streaming is sufficient in a high-quality Representation, a transmission rate makes a DASH client of Frank determine to continuously monitor an input data rate. At this moment, index information in an MPD is used to detect an appropriate Segment in an alternative Representation for switching. A segment index box of the Segment is used to detect a switching point in the form of a Random Access Point (RAP) not later than the end presentation time of the latest requested data in the current Representation. The DASH client starts to request data of the new Representation and provides the media content of the old Representation to a media player, for a subsequent seamless playback.

When Frank enters the WLAN area, the DASH client detects sufficiently fast arrival of data to support streaming of the high-quality Representation. The switching procedure is repeated and high-quality Representation ensues.

In order to provide a seamless service in a mobile environment experiencing substantial network throughput fluctuations, representation switching should be fast against throughput changes. A client may determine an appropriate Representation matching a current throughput and an appropriate Segment matching a switching time, based on an MPD. However, the client should download sidx(s) to find out an appropriate RAP in the Segment.

Accordingly, at least one HTTP partial request is necessary according to an arrangement of sidx(s) in a Segment according to this embodiment of the present invention.

Meanwhile, in case of the MPD extension, all sidx(s) of the Segment can be downloaded by one HTTP partial request, based on a range attribute of type="sidx(s)" in SegmentInfo of the MPD.

If ranges(s), a type, and duration(s) are defined according to temporal levels or a frame type, switching is possible without sidx(s), using ranges(s) with the highest priority (e.g. type="0"; I frame) and their duration(s).

To enable fast Representation switching according to a throughput change in a mobile network environment experiencing serious throughput fluctuations, server-client interactions should be reduced and a bandwidth-efficient sidx(s) request should be issued. In this context, the use of the MPD extension enables Representation switching based solely on the MPD, with a reduced number of interactions for sidx(s) download or without an additional interaction through a Priority type, and a duration.

(Case 6) "Tom has a DASH-ready mobile phone and wants to watch movie content that is available at 3 bit rates. While watching, Tom boards a crowded tram and available bandwidth of the tram is less than the 3 bit rates. Tom can continue to watch the movie."

User experience expected from this user case is not apparent. If a valid bandwidth is below the lowest available bit rate, Tom may continue to watch the movie at the lowest of the three bit rates at a normal frame rate.

Meanwhile, in embodiments according to the present invention, if a client transmits a segment wise HTTP request in a network environment in which the throughput of the client is lower than a Representation with the smallest bandwidth, the client pauses the playback due to buffer underflow and performs buffering. When receiving sidx(s) information, the client plays back the content at a low frame rate, instead of pausing the playback due to buffer underflow, by requesting only moof(s) independently decodable in a Segment using an HTTP partial request.

Further in embodiments according to the present invention, with the MPD extension, a client may transmit an HTTP partial request for only moof(s) independently decodable in a Segment, based on sidx(s) information and may play back the moof(s), as in the above embodiment.

In the presence of Priorities (e.g. type="0, 1, . . . , N") and ranges according to temporal levels of a hierarchical prediction structure in SegmentInfo of an MPD, a client transmits an HTTP partial request only for a high-priority range and plays it back.

If a range and a type with "sidx(s)" in the MPD extension are used, server-client interactions needed to receive all sidx(s) can be reduced.

Media priority information and stream range information according to an embodiment of the present invention are described in an MPD, for the following use. For instance, MPEG-DASH and 3GPP Adaptive HTTP Streaming (AHS) under standardization divides each media stream into predetermined units (i.e. moofs) and one or more moofs are grouped into a Segment in a time order. A single moof may be composed of a plurality of groups (e.g. GOPs) of media samples (e.g. video frames or MPEG/AVC NAL units). To provide index information about moofs in a single Segment, DASH uses a segment index box (sidx).

Figure 11:
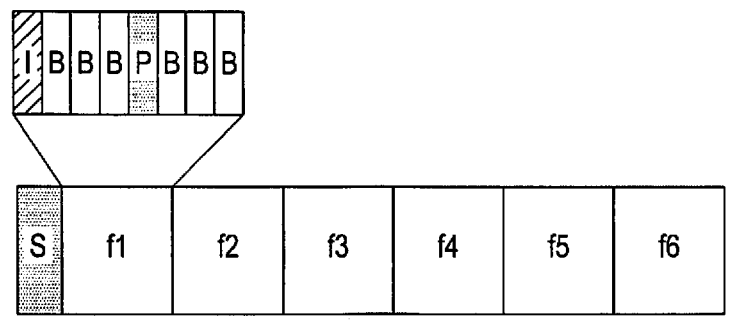
FIG. 11 illustrates a Segment structure according to an embodiment of the present invention.

FIG. 11 illustrates a Segment structure according to an embodiment of the present invention.

Referring to FIG. 11, S denotes sidx and f1 to f6 denote moofs (i.e. fragments). sidx specifies the position of each moof box in a file so as to enable moofwise access, when needed. Table 2 illustrates the syntax of sidx of MPEG-DASH and 3GPP AHS, by way of example.

TABLE 2

```
aligned(8) class SegmentIndexBox extends FullBox('sidx', version, 0) {
    unsigned int(32) reference_track_ID;
    unsigned int(16) track_count;
    unsigned int(16) reference_count;
    for (i=1; i<= track_count; i++)
    {
        unsigned int(32)track_ID;
        if (version==0)
        {
            unsigned int(32)decoding_time;
        } else
        {
            unsigned int(64)decoding_time;
        }
    }
    for(i=1; i <= reference_count; i++)
    {
        bit(1)                              reference_type;
        unsigned int(32)reference_offset;
        bit(1)                              contains_RAP;
        unsigned int(31)RAP_delta_time;
    }
}
```

When a Segment has the configuration illustrated in FIG. 11, each moof includes frames with different temporal levels (e.g. I, P and B frames). When a Trick and Random Access (TRA) situation occurs upon user request, only a specific sample group (e.g. subfragments) such as an I frame group) in each moof is played back. To support this operation, index information enabling access to a certain group of samples in the moofs needs to be added.

Methods for supporting access to a specific sample group are provided in the following application examples.

Application Example 1 (Sidx_Extension)

Table 3 illustrates a syntax that describes an sidx_extension-based method, according to an embodiment of the present invention.

TABLE 3

```
aligned(8) class SegmentIndexBox extends FullBox('sidx', version, 0) {
    unsigned int(32) reference_track_ID;
    unsigned int(16) track_count;
    unsigned int(16) reference_count;
    for (i=1; i<= track_count; i++)
    {
        unsigned int(32)track_ID;
        if(version==0)
        {
            unsigned int(32) decoding_time;
        } else
        {
            unsigned int(64) decoding_time;
        }
    }
    for(i=1; i <= reference_count; i++)
    {
        bit (1)   reference_type;
        unsigned int(31)reference_offset;
```

TABLE 3-continued

```
    bit(1)      contains_level;              //indication flag for level, added
    unsigned int(31)subsegment_duration;     //reduce one bit for contains_level, modified
    bit(1)      contains_RAP;
    unsigned int(31)RAP_delta_time;
            if (contains_level)              //added
            {
            unsigned int(8) assemble_type;   //define assemble type, add
            unsigned int(16) level_count;    //number of level(e.g. temporal id), added
            for(i=1; i<= level_count; i++)   //added
                {
                unsigned int(8) level;       //level (e.g. temporal id level) define, added
                bit(1) reserved_bit;         //reserved
                unsigned int(31) level_offset;  //offest, added
                if(assemble_type == 0x01 || assemble_type == 0x03)
                {
                    unsigned int(16) offset_count   //define no. of samples in level, added
                    for(j=1; j <= offset_count; j++)   //added
                    {
                        unsigned int(32) offset;   //offset from level_offset, added
                        unsigned int(32) size;     //size of each sample in level, added
                    }
                }
            }
        }
    }
}
```

Parameters in Table 3 have the following meanings.

contains_level: a flag bit indicating whether subfragment-wise index information is included; and assemble_type: an indicator indicating a media sample arrangement method of each moof.

Table 4 illustrates a use example of assemble_type.

TABLE 4

| assemble_type | Definition |
|---|---|
| 0x00 | Sample group box (e.g. tele box) |
| 0x01 | Assembled by equal temporal_level (e.g. IIPPBB . . . ) |
| 0x02 | Stereoscopic plain (e.g. LRLRLR . . . ) |
| 0x03 | Assembled by view (e.g. LLLRRR . . . ) |
| 0x04 | SVC plain (e.g. BEBEBE . . . ) |
| 0x05 | Assembled by equal scalability type (e.g. BBBEEE . . . ) |
| 0x06~ | Reserved | level_count: the total number of levels in a fragment;

level: defines each level. A lower value indicates a higher priority;

level_offset: position information of each level;

offset_count: an offset count to support samplewise access, when needed;

offset: the position of a sample;

size: the size of a sample;

reserved_bit: a reserved bit for extension.

The above sidx_extension enables a user to directly access a sample group having a specific level and thus a trick mode, Picture in Picture (PIP), and rate adaptation to a network environment can be more effectively supported.

The following example presents a method for providing index information about a subfragment according to a priority in a moof including one or more priorities (i.e. levels) such as a Scalable Video Coding (SVC) moof, a stereoscopic moof, and a Multiview Video Coding (MVC) moof.

Figure 12:
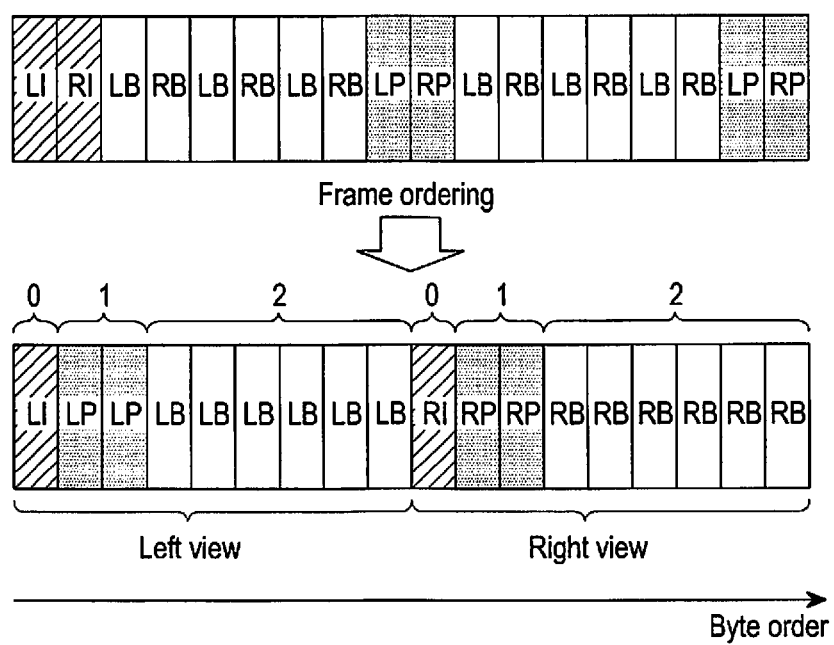
FIG. 12 illustrates a stream structure produced through sample displacement according to an embodiment of the present invention.

A stream in which samples of the left-view and right-view images of a stereoscopic image are alternately arranged is illustrated in the upper part of FIG. 12, whereas the stream is rearranged according to the left and right views, for more effective indexing and access and then rearranged according to temporal levels, as illustrated in the lower part of FIG. 12.

To describe one or more levels as stated above, subfragments are indexed according to viewpoints based on sidx_extension illustrated in Table 3 and then temporal level-based index information about the subfragment is provided by reserved_bit.

Application Example 2 (Sample Group Index Box Extension)

SampleGroupindexBox(sgix) provides the index of a sample group (subfragments) in a moof. As in the afore-described sidx_extension method, type information and level information for each sample group (subfragments) are added.

Table 5 illustrates a syntax of SampleGroupindexBox added with priority information, according to an embodiment of the present invention.

TABLE 5

```
aligned(8) class SampleGroupIndexBox
    extends FullBox('sgix', 0, 0) {
    unsigned int(32)         fragment_count;
        unsinged int(16)         level_count;
        unsigned int(8)          fragment_type;
        for( i=0; i < fragment_count; i++) {
            for ( j=1; j < level_count; j++) {
                        unsigned int(8)      level;
                        unsigned int(32)     offset;
                        unsigned int(32)     size;
            }
        }
}
``` fragment_type: indicates the configuration method of a sample group (subfragments), identical to assemble_type in sidx_extension;

level: defines the level of a sample group (subfragments). A lower value indicates a higher priority;

offset: the offset of a sample; and size: the size of a sample.

Application Example 3 (Sidx_Extension)

Table 6 illustrates a syntax according to an sidx extension-based method according to an embodiment of the present invention.

TABLE 6

```
aligned(8) class SegmentIndexBox extends FullBox('sidx', version, 0) {
    unsigned int(32) reference_track_ID;
    unsigned int(16) track_count;
    unsigned int(16) reference_count;
    for (i=1 ; i<= track_count; i++)
    {
        unsigned int(32)   track_ID;
        if (version==0)
        {
            unsigned int(32)   decoding_time;
        } else
        {
            unsigned int(64)   decoding_time;
        }
    }
    for(i=1; i <= reference_count; i++)
    {
        bit (1)    reference_type;
        unsigned int(31)   reference_offset;
        bit(1)     contains_level;        //indication flag for level, added
        unsigned int(31)   subsegment_duration;   //reduce one bit for contains_level, modified
        bit(1)     contains_RAP;
        unsigned int(31)   RAP_delta_time;
        if (contains_level)   //added
        {
            unsigend int(8)    assemble_type;   //define assemble type, add
            unsigned int(16) level_count;   //number of level(e.g. temporal id), added
            for(i=1; i <= level_count; i++)   //added
            {
                unsigned int(8)   level;   //level(e.g. temporal id level) define, added
                bit(1)           reserved_bit;   //reserved
                unsigned int(31)  level_offset;   //offest, added
                if(assemble_type == 0x01 || assemble_type == 0x03)
                {
                    unsigned int(16) offset_count   //define number of samples in level, added
                    for(j=1; j <= offset_count; j++)   //added
                    {
                        unsigned int(32)   offset;   //offset from level_offset, added
                        unsigned int(32)   size;    //size of each sample in level, added
                    }
                }
            }
        }
    }
}
```

Parameters in Table 6 have the following meanings.

contains_level: a flag bit indicating whether subfragment-wise index information is included; and assemble_type: has an integer, as an indicator indicating the type of a sample group, which may be formed according to its characteristics. For instance, samples can be grouped largely into a video sample group and an audio sample group.

Video samples may be divided into more sample groups according to their purposes. For instance, independently decodable samples to support TRA may be grouped into one sample group. In case of a video supporting temporal scalability, sample groups may be formed in such a manner that each sample group includes samples with the same temporal level. In case of a stereoscopic video, samples may be grouped according to viewpoints. MVC samples may also be grouped according to view ids.

level_count: the total number of levels in a fragment;

level: defines each level. A lower value indicates a higher priority. According to the meaning of level_count, level can be used differently. If a priority is assigned according to a higher or lower value of level_count, the level field is not included. If a level is assigned irrespective of level_count, this level field is particularly meaningful;

level_offset: position information about each level;

offset_count: an offset count to support samplewise access, when needed;

offset: the position of a sample;

size: the size of a sample; and reserved_bit: a reserved bit for extension.

Application Example 4 (Sample Group Index Box Extension)

SampleGroupindexBox(sgix) provides the index of a sample group (subfragments). As in the afore-described sidx_extension method, type information, level information, and size information (SampleGroupSize) for each sample group (subfragments) are added.

Table 7 illustrates a syntax of SampleGroupindexBox added with priority information, according to an embodiment of the present invention.

TABLE 7

```
aligned(8) class SampleGroupIndexBox
    extends FullBox('sgix', 0, 0) {
    unsigned int(32)    fragment_count;
        unsigned int(16)   level_count;
        unsigned int(8)    fragment_type;
        for( i=0; i < fragment_count; i++) {
            for ( j=1; j < level_count; j++) {
                unsigned int(8)    level;
                unsigned int(32)   SamepleGroupSize;
            }
        }
}
```

Parameters of Table 7 have the following meanings.

fragment_type: has an integer, as an indicator of the type or access point of a sample group. Sample groups may be grouped largely into a video sample group and an audio sample group according to media types. The video samples may be further classified into more detailed sample groups. For instance, independently decodable samples to support TRA may be grouped into the same sample group. In case of a video supporting temporal scalability, sample groups may be formed in such a manner that each sample group includes samples with the same temporal level. In case of a stereoscopic video, samples may be grouped according to viewpoints. MVC samples may also be grouped into sample groups each having the same viewpoint. If a scalable video supports one or more scales, one or more sample groups may be defined accordingly. fragment_type of a sample group may be described as the type or access point of the sample group;

level: defines each level. A lower value indicates a higher priority. According to the meaning of level_count, level can be used differently. If a priority is assigned according to a higher or lower value of level_count, level is not included. If a level is assigned irrespective of level_count, this level field is particularly meaningful. Table 8 illustrates a syntax with the level field not included; and SampleGroupSize: the size of a sample group. Since information about the size and offset of each sample can be acquired from the sample group to which the sample belongs, only the size of each sample group is presented.

Table 8 illustrates a syntax of SampleGroupindexBox in which a sample group is indicated by fragment_type only, according to an embodiment of the present invention.

TABLE 8

```
aligned(8) class SampleGroupIndexBox
    extends FullBox('sgix', 0, 0) {
    unsigned int(32)    fragment_count;
        unsigned int(16)   level_count;
        unsigned int(8)    fragment_type;
        for( i=0; i < fragment_count; i++) {
            for ( j=1; j < level_count; j++) {
                unsigned int(32)   SampleGroupSize;
            }
        }
}
```

According to an embodiment of the present invention, TRA is supported as follows.

To move to a specific time point requested by a user or play back at a multiple speed, information about a Segment corresponding to the time point is acquired from an MPD. Information about a moof corresponding to the requested time point is checked using sidx of the Segment, and independently decodable samples of the moof are accessed based on the disclosed SampleGroupindexBox.

Level may also be used as a sample group identifier. If one or more sample groups should be correlated using an identifier, the same value may be assigned to the sample groups using the level field. For instance, if a stereoscopic video is classified into a left-view sample group and a right-view sample group, the same level value is assigned to the sample groups. In this manner, a relationship between sample groups can also be defined using, for example, the level field for SVC or MVC.

On the other hand, to describe the relationship between the sample groups of a stereoscopic service without utilizing the level field, embodiments of the present invention introduce an additional new box. For example, when the disclosed box is used to support the TRA of the stereoscopic service, fragment_type and SampleGroupSize are provided. To support this scheme, the temporal/spatial relationship between sample groups should be indicated by dependency_id and a sample group ID.

Application Example 5 (Subfragment Index Box Extension)

SubFragmentIndexBox (sfix) provides index information about a sub-sample group or a subfragment as in Application Examples 2 and 4. SubFragmentIndexBox (sfix) is extended as illustrated in Table 9 in order to support access to a subfragment or sub-sample group that is a part of a fragment due to such factors as a user request or a network environment.

Table 9 illustrates a syntax of sfix extension to provide index information about a subfragment or sub-sample group, according to an embodiment of the present invention.

TABLE 9

```
aligned(8) class SubFragmentIndexBox
    extends FullBox('sfix', 0, flags) {
    unsigned int(32)         fragment_count;
    unsigned int(8)          fragment_level_count;
    for ( j=1; j < fragment_level_count) {
        if ((flags & 1) == 0)
            unsigned int(32) track_id;
        else
            unsigned int(32) sub_track_id;
    }
    for( i=0; i < fragment_count; i++)
        for ( j=0; j < fragment_level_count; j++)
            unsigned int(32) accumulated_level_size;
}
```

In Table 9, sfix provides index information about a subfragment or sub-sample group. In a scenario in which a part of a fragment is combined or used, such as SVC, MVC, TRA situations, specifically when an independently decodable subfragment or sub-sample group of a fragment should be accessed for TRA, a CODEC is adaptable as for SVC, or only a subfragment or sub-sample group with a specific scale is used, an indicator should be provided to enable access to the subfragment or sub-sample group. Accordingly, track_id or sub_track_id is provided to thereby access a specific subfragment of sub-sample group, as illustrated in Table 9.

Parameters and their meanings in Table 9 are given as follows.

fragment_count: the number of fragments included in sfix;

fragment_level_count: the number of levels included in each fragment;

track_id: indicates that a subfragment or sub-sample group includes a part of data in a track indicated by track_id;

sub_track_id: indicates that a subfragment or sub-sample group includes a part of data in a sub-track indicated by sub_track_id. Although ids are not assigned to sub-tracks at present, sub_track_id may be disclosed in the future. Otherwise, it may be preset that sub_track_id increases gradually according to the number of sub-tracks included in a track, when sub_track_id is used; and accumulated_level_size: the total size of a subfragment or sub-sample group.

The above sfix extension does not include configuration information about each subfragment or sub-sample group (fragment_type or assemble_type in Application Examples 1 to 4). Therefore, the type of the subfragment or sub-sample group may be indicated in a subfragment box or sub-sample group box.

The above-described methods according to embodiments of the present invention may be used in combination, when needed.

As is apparent from the above description of embodiments of the present invention, a transmission delay can be reduced significantly by discontinuing data transmission upon timeout. When a packet is lost due to fading of a radio channel, ACK spoofing is used to thereby fully utilize a bit rate. In addition, an initial screen is quickly invoked using a preview method in a slow start environment, thereby significantly reducing an initial buffering delay and a channel zapping delay. Accordingly, a user can enjoy an HTTP streaming service more conveniently, fully utilizing available radio resources.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method for receiving a media data, comprising:
    receiving, by a client from a server, a media presentation description (MPD);
    receiving, by the client from the server, media data based on the MPD, wherein the media data comprises a segment including segment index information indicating a corresponding byte range related to a fragment included in the media data and fragment index information for identifying a level of a subfragment in the fragment; and
    accessing, by the client, the subfragment based on the fragment index information and decoding the subfragment.

2. The method of claim 1, wherein the fragment index information comprises information on a size of the subfragments.

3. The method of claim 1, wherein the fragment index information comprises information on a number of levels representing priorities of the subfragments.

4. The method of claim 1, wherein the segment index information comprises an indicator indicating an arrangement method of the subfragments.

* * * * *